US008610914B2

(12) United States Patent
Kuroishi et al.

(10) Patent No.: US 8,610,914 B2
(45) Date of Patent: Dec. 17, 2013

(54) COMMUNICATION APPARATUS, COMMUNICATION METHOD, COMPUTER READABLE MEDIUM AND IMAGE FORMING APPARATUS

(75) Inventors: Kenji Kuroishi, Ebina (JP); Kazuaki Watanabe, Ebina (JP); Seigo Makida, Ashigarakami-gun (JP); Kazuhiko Narushima, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1255 days.

(21) Appl. No.: 12/207,749

(22) Filed: Sep. 10, 2008

(65) Prior Publication Data
US 2009/0244588 A1 Oct. 1, 2009

(30) Foreign Application Priority Data

Mar. 27, 2008 (JP) ................. 2008-083239

(51) Int. Cl.
*G06F 3/12* (2006.01)
*G06K 15/00* (2006.01)
(52) U.S. Cl.
USPC ........ 358/1.14; 358/1.13; 358/1.15; 370/394; 370/352; 370/389; 370/392
(58) Field of Classification Search
USPC ........... 358/1.13, 1.15, 1.14; 703/20; 709/227
See application file for complete search history.

(56) References Cited

U.S. PATENT DOCUMENTS

| | | | | |
|---|---|---|---|---|
| 5,337,313 A * | 8/1994 | Buchholz et al. | ............. | 370/394 |
| 5,991,290 A * | 11/1999 | Malik | ............. | 370/352 |
| 6,081,663 A * | 6/2000 | Takahashi et al. | ............. | 703/20 |
| 6,389,016 B1 * | 5/2002 | Sabaa et al. | ............. | 370/389 |
| 6,519,051 B1 * | 2/2003 | Wu et al. | ............. | 358/1.15 |
| 7,120,927 B1 * | 10/2006 | Beyda et al. | ............. | 726/2 |
| 7,206,088 B2 * | 4/2007 | Tanimoto | ............. | 358/1.15 |
| 7,463,374 B2 * | 12/2008 | Corlett et al. | ............. | 358/1.14 |
| 7,965,399 B2 * | 6/2011 | Miyamoto | ............. | 358/1.14 |
| 2003/0219251 A1 * | 11/2003 | McMurry et al. | ............. | 398/58 |
| 2004/0246512 A1 * | 12/2004 | Miyamoto | ............. | 358/1.13 |
| 2005/0068565 A1 * | 3/2005 | Maeda | ............. | 358/1.15 |
| 2007/0211725 A1 * | 9/2007 | Kawata et al. | ............. | 370/392 |
| 2008/0195688 A1 * | 8/2008 | Watanabe | ............. | 709/201 |
| 2009/0083427 A1 * | 3/2009 | Kuroishi et al. | ............. | 709/227 |

FOREIGN PATENT DOCUMENTS

JP 2006-215686 A 8/2006

* cited by examiner

*Primary Examiner* — Akwasi M Sarpong
(74) *Attorney, Agent, or Firm* — Sughrue Mion, PLLC

(57) ABSTRACT

The communication apparatus including: a communication unit communicating with external apparatuses via a communication line; a notification unit notifying, from the communication unit, the external apparatuses of stop of electric power supply to a controller controlling operation, when electric power supply to the controller is stopped; an identification information memory for storing identification information of one of the external apparatuses when, after the notification unit makes the notification, the notification unit again makes the notification to the one of the external apparatuses upon receipt of a signal from the one of the external apparatuses; and a signal processor processing a signal received from any of the external apparatuses by the communication unit. The signal processor discards a signal, when a transmission source of the signal is one of the external apparatuses having the identification information matching the identification information stored in the identification information memory.

22 Claims, 9 Drawing Sheets

FIG.8A

|   | TRANSMISSION SOURCE MAC ADDRESS | TIME OF RECEPTION | STATUS OF WHETHER OR NOT PROCESSING HAS BEEN MADE |
|---|---|---|---|
| 1 | 01-A1-56-68-1B-CD | 2008:02:20:12:23:56 | YES |
| 2 | 02-E2-34-56-2F-GH | 2008:02:20:12:35:45 | YES |
| 3 | 30-I3-78-90-3J-KL | 2008:02:20:12:43:12 | NO |
| ... | ... | ... | ... |

FIG.8B

|   | TRANSMISSION SOURCE IP ADDRESS | TIME OF RECEPTION | STATUS OF WHETHER OR NOT PROCESSING HAS BEEN MADE |
|---|---|---|---|
| 1 | 172.16.101.24 | 2008:02:20:12:23:15 | YES |
| 2 | 182.168.19.31 | 2008:02:20:12:31:52 | NO |
| 3 | 172.198.29.35 | 2008:02:20:12:43:51 | YES |
| ... | ... | ... | ... |

FIG.8C

|   | DESTINATION PORT NUMBER |
|---|---|
| 1 | 80 |
| 2 | 161 |

FIG.9

| TIME ZONE | PACKET PROCESSING SETTING |
|---|---|
| 21:00:00-7:59:59 | ON |
| 8:00:00-20:59:59 | OFF |

COMMUNICATION APPARATUS, COMMUNICATION METHOD, COMPUTER READABLE MEDIUM AND IMAGE FORMING APPARATUS

CROSS REFERENCE TO RELATED APPLICATIONS

This application is based on and claims priority under 35 USC §119 from Japanese Patent Application No. 2008-083239 filed Mar. 27, 2008.

BACKGROUND

1. Technical Field

The present invention relates to a communication apparatus, a communication method, a computer readable medium and an image forming apparatus.

2. Related Art

In offices and the like in general, a system for sharing or selectively using image forming apparatuses is constructed. In this system, terminal apparatuses such as personal computers and image forming apparatuses such as printers are connected to one another under a network environment. In such a system, signals are frequently transmitted to an image forming apparatus via a network from an unspecified terminal apparatus and the like. For this reason, the CPU in the image forming apparatus is started up every time receiving a signal, even when the received signal is unnecessary to be processed in the image forming apparatus. As a result, wasteful electric power consumption occurs. In this regard, there is a demand for reducing, in an image forming apparatus, electric power consumption due to unspecified signals from the network.

SUMMARY

According to an aspect of the present invention, there is provided a communication apparatus including: a communication unit that communicates with external apparatuses via a communication line; a notification unit that notifies, from the communication unit, the external apparatuses of stop of electric power supply to a controller which controls operation, when electric power supply to the controller is stopped; an identification information memory in which identification information of one of the external apparatuses is stored when, after the notification unit makes the notification, the notification unit again makes the notification to the one of the external apparatuses upon receipt of a signal from the one of the external apparatuses; and a signal processor that processes a signal received from any of the external apparatuses by the communication unit. The signal processor discards a signal received by the communication unit, when a transmission source of the signal received by the communication unit is one of the external apparatuses that has the identification information matching the identification information stored in the identification information memory.

BRIEF DESCRIPTION OF THE DRAWINGS

Exemplary embodiment(s) of the present invention will be described in detail based on the following figures, wherein:

FIG. 8A shows an example of a management table (MAC address management table) for managing MAC addresses in the address memory of the communication part;

FIG. 8B shows an example of a management table (IP address management table) for managing IP addresses in the NVM of the controller;

FIG. 8C shows an example of a management table (port number management table) for managing port numbers in the NVM of the controller; and FIG. 9 shows an example of a time zone during which the packet processing shown in FIGS. 4 to 6 is executed in the case where the sleep mode is set in the image forming apparatus.

DETAILED DESCRIPTION

Hereinafter, a detailed description will be given of exemplary embodiments of the present invention with reference to the accompanying drawings.

Figure 1:
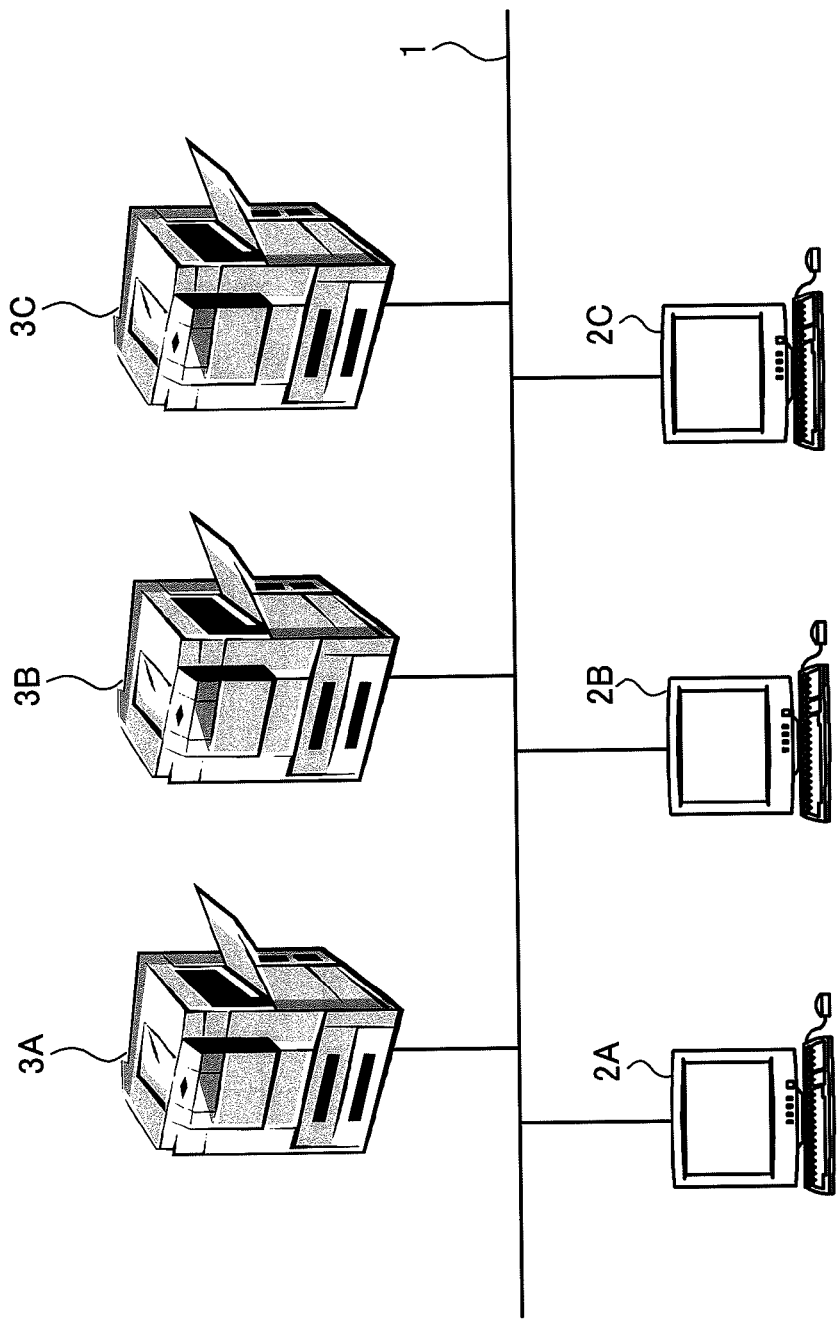
FIG. 1 is a schematic configuration diagram showing an example of a communication system to which an image forming apparatus of the exemplary embodiment is connected.

FIG. 1 is a schematic configuration diagram showing an example of a communication system to which an image forming apparatus of the exemplary embodiment is connected. In the communication system shown in FIG. 1, client apparatuses 2A to 2C (hereinafter, also simply and collectively referred to as "a client apparatus 2") and image forming apparatuses 3A to 3C (hereinafter, also simply and collectively referred to as "an image forming apparatus 3") are connected via a network 1 such as a local area network (LAN), a wide area network (WAN), and the internet using a cable as an example of a communication line so as to bi-directionally communicates with each other. The client apparatuses 2A to 2C are an example of an external apparatus installed in, for example, a work space of a user (such as a desk) or the like, and the image forming apparatuses 3A to 3C are an example of an image forming apparatus for forming an image on a medium (paper sheet) such as a recording paper on the basis of image data which are generated, stored and the like in the client apparatuses 2A to 2C. The communication line may also include a telephone line and a satellite communication line (e.g., spatial transmission line in digital satellite broadcasting). It should be noted that, in the configuration shown in FIG. 1, three client apparatuses 2A to 2C and three image forming apparatuses 3A to 3C are connected as an example. However plural client apparatuses 2 and plural image forming apparatuses 3 are connectable on the network 1, in general.

As the client apparatus 2 connected to the network 1, for example, a personal computer (PC) is used, and image data including a document, a figure, a photograph and the like are generated and stored. When printing the generated image data and the stored image data, the client apparatus 2 converts the image data into a print job that is a print command to any one of the image forming apparatuses 3A to 3C, and outputs it. The data which forms this print job (print job data) is configured by including not only the image data but also attribute data that are information for setting various print functions and designating any one of the image forming apparatuses 3A to 3C which executes printing.

The print job outputted from the client apparatus 2 is transmitted to any one of the image forming apparatuses 3A to 3C via the network 1.

Next, a description will be given of a configuration of the image forming apparatus 3.

Figure 2:
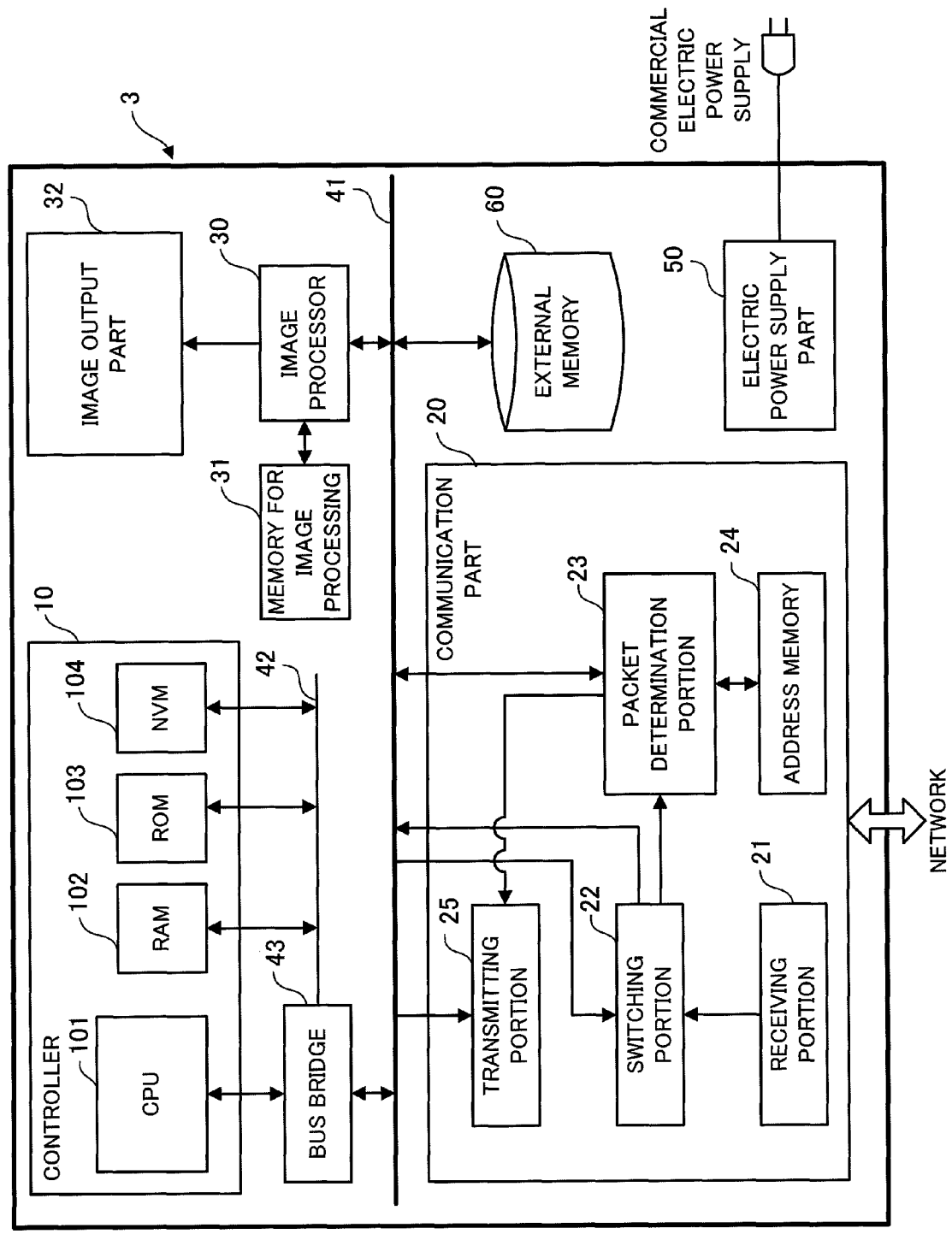
FIG. 2 is a block diagram for explaining a configuration of the image forming apparatus of the exemplary embodiment.

FIG. 2 is a block diagram for explaining a configuration of the image forming apparatus 3 of the exemplary embodiment. As shown in FIG. 2, the image forming apparatus 3 is provided with a controller 10 for controlling operation of the entire image forming apparatus 3 according to a processing program set in advance, and a communication part 20 for communicating with the network 1. Further, the image forming apparatus 3 is provided with an image processor 30 for analyzing print job data transmitted from the client apparatus 2 via the network 1 and performing various kinds of processings for image data included in the print job data, a memory for image processing 31 used as a work memory when the image processor 30 performs various kinds of processing or the like, and an image output part 32 for forming an image on a paper sheet on the basis of image data subjected to the various kinds of processings by the image processor 30. As the image output part 32, an image forming engine with an electrophotographic method is used, for example. The image processor 30, the image output part 32, and further other functional parts, as necessary, function as an image forming unit.

Here, the communication part 20 and the image processor 30 are connected to an external bus 41. Further, the controller 10 is connected to the external bus 41 via a bus bridge 43. By this configuration, the controller 10, the communication part 20, and the image processor 30 mutually transmit and receive signals via the external bus 41 and the bus bridge 43.

Further, the image forming apparatus 3 is provided with an electric power supply part 50 as an example of an electric power supply unit that converts, for example, electric power with 100V supplied from a commercial electric power supply into that with a certain voltage (e.g. 24V, 12V or 5V). Electric power with the certain voltage is supplied from the electric power supply part 50 to respective functional parts. In addition, the image forming apparatus 3 is provided with an external memory 60 for storing various kinds of programs and various kinds of data such as image data.

The controller 10 is an example of a controller. The controller 10 is provided with, as shown in FIG. 2, a central processing unit (CPU) 101 for performing an arithmetic processing for controlling the entire image forming apparatus 3, a random access memory (RAM) 102 for storing a processing program and the like executed in the CPU 101, a read only memory (ROM) 103 for storing data such as a setting value used for a processing program or the like executed in the CPU 101, and a non-volatile memory (NVM) 104 such as a static random access memory (SRAM), a flash memory or the like in which certain data are stored. These are mutually connected with each other via an internal bus 42 connected to the bus bridge 43.

A processing program executed in the controller 10 is provided by loaded from, for example, a hard disk drive (HDD) or the like as the external memory 60 into the RAM 102 when the image forming apparatus 1 is started up, for example. In addition, as another aspect of providing the processing program, the processing program may be stored in the ROM 103 in advance, and be loaded into the RAM 102 from the ROM 103. Moreover, when a rewritable ROM 103 such as an EEPROM is provided, only the processing program may be provided to and installed in the ROM 103 and may be loaded into the RAM 102 from the ROM 103, after the assembling of the controller 10 is completed. In addition, the processing program may be transmitted to the controller 10 through a network such as the Internet, and then be installed in the RAM 102 in the controller 10. Further, the processing program may be provided in a state where the processing program is stored in a memory medium such as a CD-ROM.

The controller 10 functions as a signal processor, and the controller 10 processes a packet transmitted via the network 1. For example, when the received packet relates to a print job, the packet is transmitted to the image processor 30. In the NVM 104 as an example of an identification information memory, address information (refer to the later description) and the like that are included in a packet that is unnecessary to be processed by the controller 10 is stored. Thus, when the received packet is unnecessary to be processed by the controller 10 since the received packet includes address information or the like (refer to a later stage) stored in the NVM 104, the controller 10 performs a processing such as discard of the packet.

Figure 3:
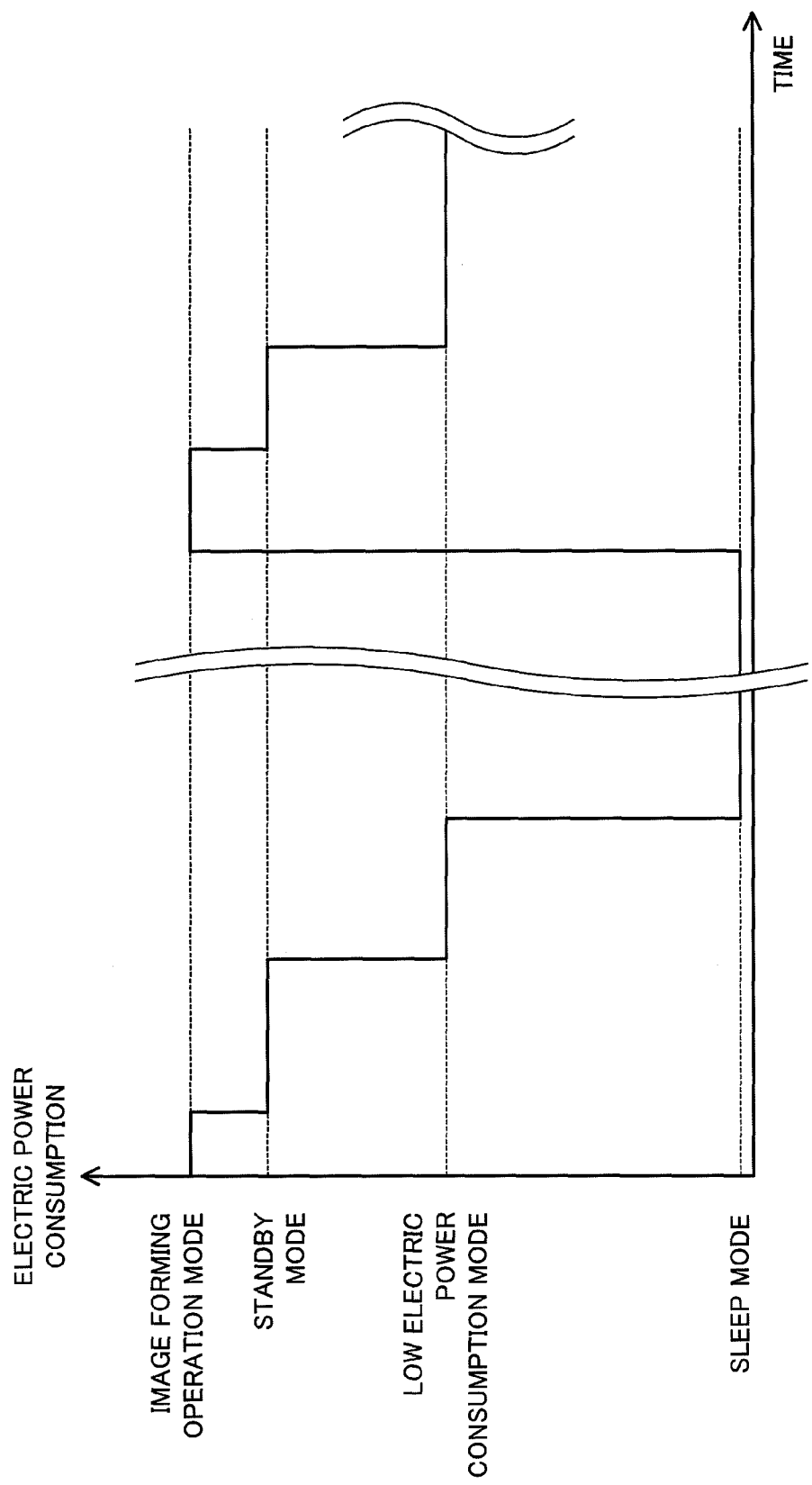
FIG. 3 is a graph for explaining the operation modes set in the image forming apparatus of the exemplary embodiment.

In addition, the controller 10 controls operation modes of the image forming apparatus 3. FIG. 3 is a graph for explaining the operation modes set in the image forming apparatus 3 of the exemplary embodiment. As shown in FIG. 3, in order to enhance electric power saving effect during the operation, any of "an image forming operation mode," "a standby mode," "a low electric power consumption mode," and "a sleep mode" is selectively set as the operation mode in the image forming unit 3.

The image forming operation mode is an operation state in which an image forming operation is executed for image data onto a paper sheet in the image output part 32. The standby mode is an operation state in which on-demand response to an input of the image data is set, and the standby mode is shifted to the image forming operation mode depending on an input of image data. In the image forming operation mode and the subsequent standby mode, electric power is supplied from the electric power supply part 50 to all the functional parts in the image forming apparatus 3. Thus, electric power for the image forming operation and on-demand response to an input of image data and the like is supplied.

The low electric power consumption mode is an operation state which is set when, for example, image data or the like are not inputted during and after a first period. In the low electric power consumption mode, electric power supply is stopped from the electric power supply part 50 to at least the image forming engine (e.g., a functional parts that execute the image forming operation, including a fixing device or the like) of the image output part 32. On the other hand, the electric power supply is continued to the functional parts other than the image forming engine of the image output part 32, such as the controller 10 and the communication part 20.

Further, the sleep mode is an operation state that is set in the case when image data or the like are not inputted during and after a second period set with a longer time than the first period. In the sleep mode, the electric power supply is continued from the electric power supply part 50, only to the communication part 20, and the electric power supply is stopped to the other functional parts including the CPU 101 of the controller 10. Thus, the sleep mode obtains higher electric power saving effect than the low electric power consumption mode.

Next, the communication part 20 is an example of a communication unit and a communication function unit, and is provided with a receiving portion 21, a switching portion 22, a packet determination portion 23, an address memory 24, and a transmitting portion 25.

The receiving portion 21 is connected to the network 1, and the receiving portion 21 receives a packet transmitted from the network 1. The receiving portion 21 then forwards the received packet to the switching portion 22.

The switching portion 22 switches the destination of the packet received by the receiving portion 21 from the network 1. Specifically, the switching portion 22 acquires information on the transition of the operation mode (operation mode transition information) from the controller 10. When the operation mode having been set by the controller 10 is any of the image forming operation mode, the standby mode, and the low electric power consumption mode, the receiving portion 21 forwards a packet received from the network 1 directly to the controller 10 after the acquisition of the operation mode transition information. On the other hand, when the operation mode set by the controller 10 is the sleep mode, the receiving portion 21 forwards a packet received from the network 1 to the packet determination portion 23 after the acquisition of the operation mode transition information.

The packet determination portion 23 is an example of a signal processor, and determines whether or not a packet received from the network 1 in a state where the operation mode is set to the sleep mode is a packet that is necessary to be transmitted to the controller 10.

The address memory 24 is an example of an identification information memory, and stores address information of a transmission source of a packet that is not necessary to be transmitted to the controller 10. Specifically, the packet determination portion 23 determines that a packet is not necessary to be transmitted to the controller 10 on the basis of address information of the transmission source (client apparatus 2) included in the packet. In this event, the address memory 24 stores the address information of the client apparatus 2.

The transmitting portion 25 acquires, from the controller 10, the operation mode transition information indicating the transition to the sleep mode, when the controller 10 sets the operation mode to the sleep mode. Then, upon acquisition of the operation mode transition information, the transmitting portion 25 transmits a packet (sleep mode transition notification packet) that notifies the client apparatus 2 connected to the network 1 of the transition to the sleep mode in the image forming apparatus 3A, for example. Accordingly, the controller 10 and the transmitting portion 25 function as a notification unit. In addition, when the controller 10 generates a packet (response packet) responding to a received packet, the transmitting portion 25 receives the response packet from the controller 10 and transmits the received response packet to the client apparatus 2 as the transmission source.

As described above, when the controller 10 shifts the operation mode to the sleep mode, the communication unit 20 transmits, to the client apparatuses 2 connected to the network 1, the sleep mode transition notification packet that notifies the client apparatuses 2 of the transition to the sleep mode. After that, the controller 10 shifts the operation mode of the image forming apparatus 3 to the sleep mode. If the client apparatus 2 having received the sleep mode transition notification packet has a software program or the like for interpreting the sleep mode transition notification packet, the client apparatus 2 stops transmission of packets other than a print job. Here, examples of such transmission of packets other than a print job include a polling access. In the polling access, by using the simple network management protocol (SNMP), an inquiry message for inquiring whether or not the image forming apparatus 3 intends to establish communications is sequentially transmitted to the image forming apparatus 3. Upon receipt of a reply to the inquiry message from the image forming apparatus 3, the image forming apparatus 3 is given a transmission right allowing the image forming apparatus 3 to execute transmission.

However, some client apparatuses 2 having received the sleep mode transition notification packet do not have such a software program or the like for interpreting the sleep mode transition notification packet in some cases.

Such a client apparatus 2 continues transmission of packets other than a print job, such as a polling access, to the image forming apparatus 3 that has transmitted the sleep mode transition notification packet. In this case, the controller 10 having set to the sleep mode is started up, not only when a print job necessary to be processed is transmitted, but also every time a polling packet or the like is transmitted. For this reason, even when the operation mode is set to the sleep mode, reduction in electric power consumption in the image forming apparatus 3 is limited.

In this respect, when the sleep mode transition notification packet is transmitted to the client apparatus 2 connected to the network 1, the communication unit 20 stores identification information (address information) of the client apparatus 2, which is an example of an external apparatus, performing a polling access or the like after the transmission.

Then, the communication unit 20 re-transmits the sleep mode transition notification packet to the client apparatus 2 performing a polling access or the like. After the re-transmission of the sleep mode transition notification packet, if any of the client apparatuses 2 performs a polling access or the like, the communication unit 20 controls so that packets including a polling packet, other than a print job, received from such a client apparatus 2 are discarded and are not forwarded to the controller 10. Accordingly, even when a packet unnecessary to be processed by the controller 10 is transmitted, the CPU 101 is not started up. As a result, electric power consumption of the image forming apparatus 3 having the operation mode being set to the sleep mode is maintained at a low level.

Here, the packet processing in the image forming apparatus 3 having the operation mode being set to the sleep mode will be described.

Figure 4:
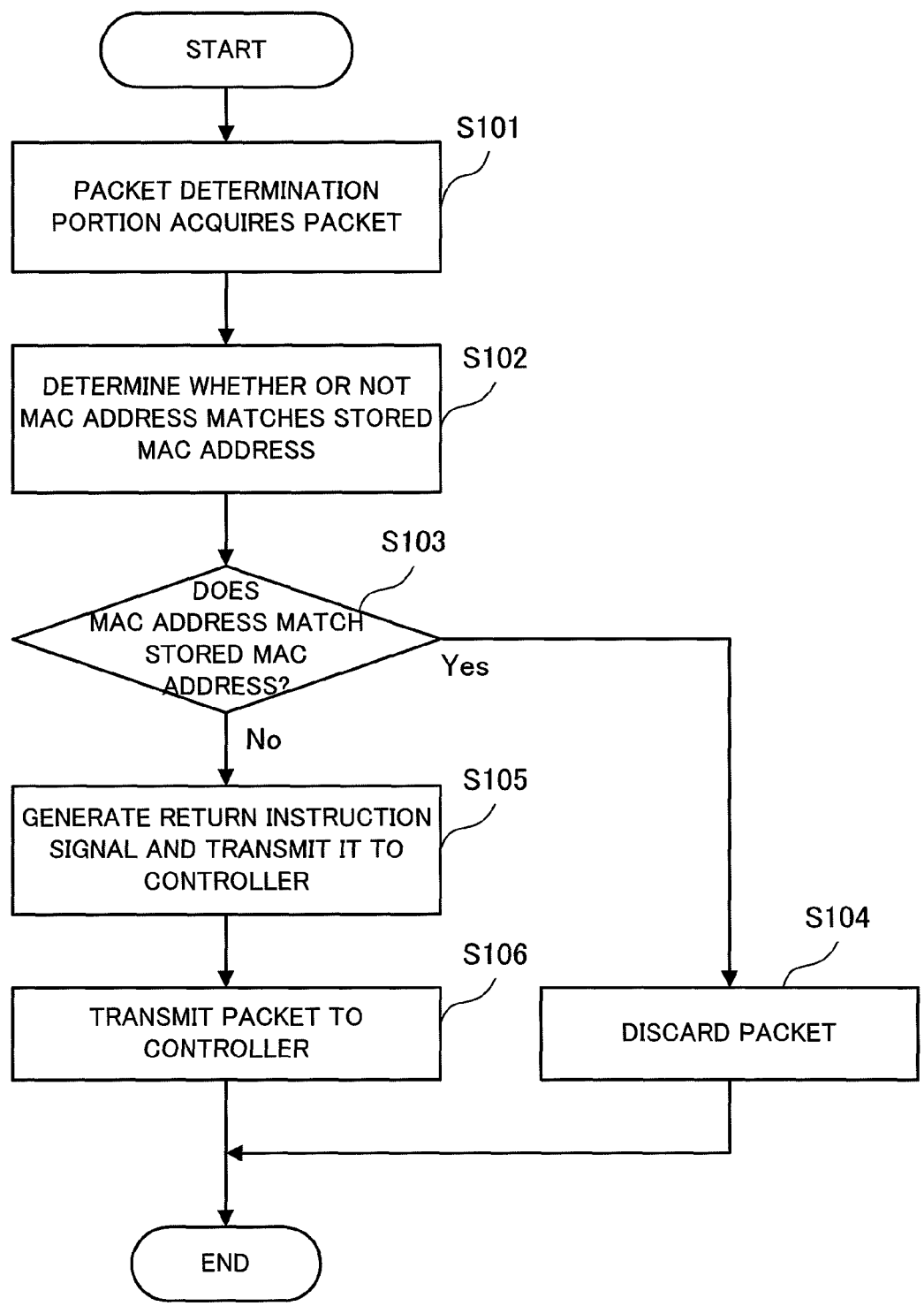
FIG. 4 is a flowchart showing an example of the operation in the communication part when a packet is transmitted via the network during the sleep mode.

FIG. 4 is a flowchart showing an example of the operation in the communication part 20 when a packet is transmitted via the network 1 during the sleep mode. FIG. 4 shows the operation after the sleep mode transition notification packet is transmitted from the communication part 20 to the client apparatus (external apparatus) 2 connected to the network 1.

As shown in FIG. 4, after the transmission of the sleep mode transition notification packet, in the communication part 20, the packet determination portion 23 acquires, from the switching portion 22, a packet received by the receiving portion 21 (Step 101). The packet determination portion 23 then determines whether or not a media access control (MAC) address described in the acquired packet matches any MAC address stored in the address memory 24 (Step 102). Here, the MAC address is an example of identification information for identifying the client apparatus 2 that is the transmission source of the packet. Moreover, the MAC address stored in the address memory 24 is an MAC address of the client apparatus 2 that has transmitted a polling packet or the like, other than a print job, to the image forming apparatus 3 after the communication part 20 transmits the sleep mode transition notification packet at the time of transition to the sleep mode.

As a result of the determination in Step 102, when the MAC address described in the acquired packet matches the MAC address stored in the address memory 24 (Step 103), the communication part 20 discards the received packet (Step 104). Specifically, as will be described at a later stage, if any client apparatus (external apparatus) 2 transmits a polling packet or the like to the image forming apparatus 3 after the sleep mode transition notification packet is transmitted at the time of transition to the sleep mode, the MAC address of the client apparatus 2 is stored in the address memory 24 while the sleep mode transition notification packet is transmitted again to the client apparatus 2 (refer to Step 217 at the later stage). Accordingly, if the MAC address described in a packet matches the MAC address stored in the address memory 24, this indicates that the packet is transmitted from the client apparatus 2 to which the sleep mode transition notification packet has been transmitted again for the second time. Then, in the processing in Step 104, the client apparatus 2 that transmits a polling packet or the like after the re-transmission of the sleep mode transition notification packet is judged to have no function for interpreting that the sleep mode has been set in the image forming apparatus 3. Upon the determination, a polling packet or the like transmitted from that client apparatus 2 is discarded.

On the other hand, as a result of the determination in Step 102, if the MAC address described in the acquired packet does not match the MAC address stored in the address memory 24 (Step 103), the communication part 20 generates a return instruction signal to start electric power supply to the controller 10 (CPU 101), and transmits the generated return instruction signal to the controller 10 (Step 105). After the controller 10 is started up, the communication part 20 transmits the received packet to the controller 10 (CPU 101) (Step 106).

Figure 5:
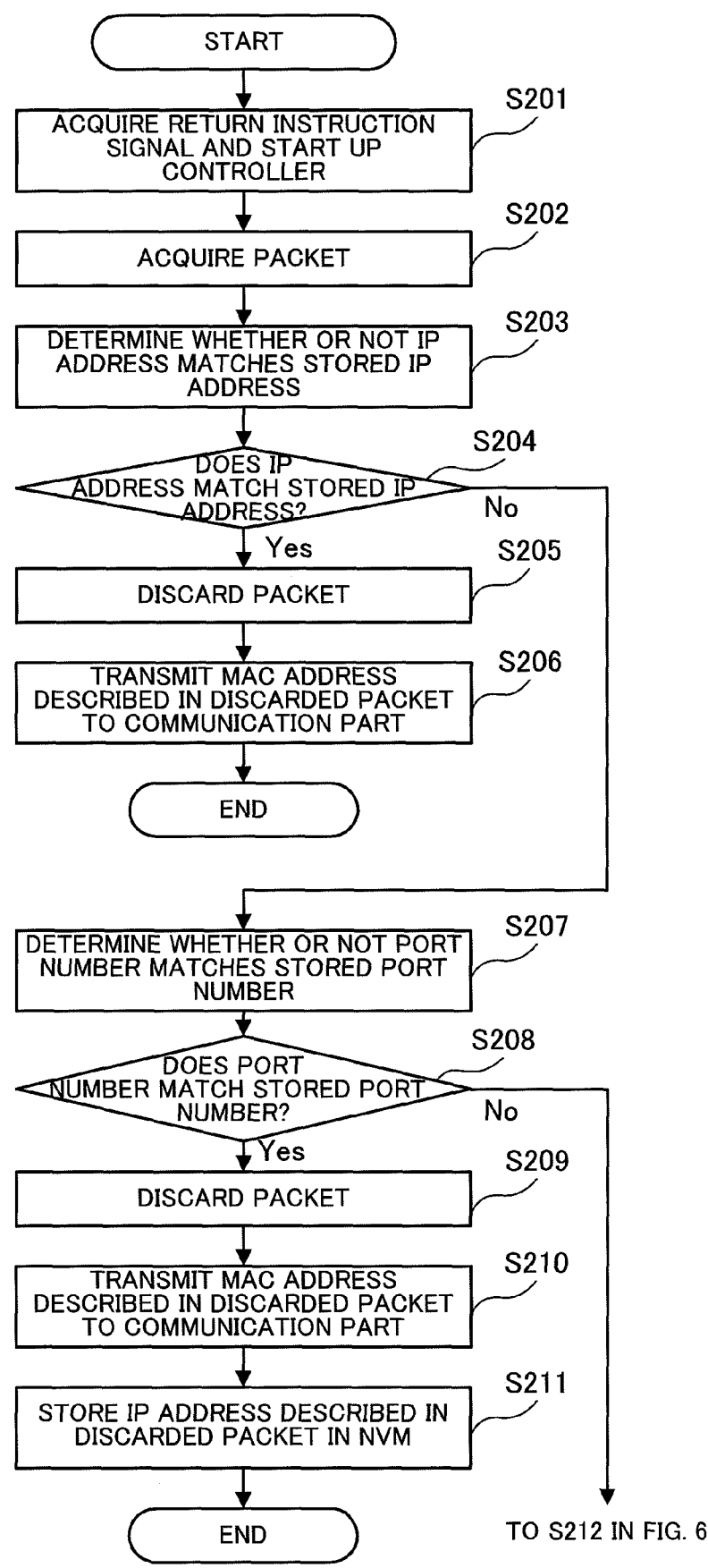
FIGS. 5 and 6 are flowcharts showing an example of the operation of the controller having acquired a return instruction signal from the communication part.
Figure 6:
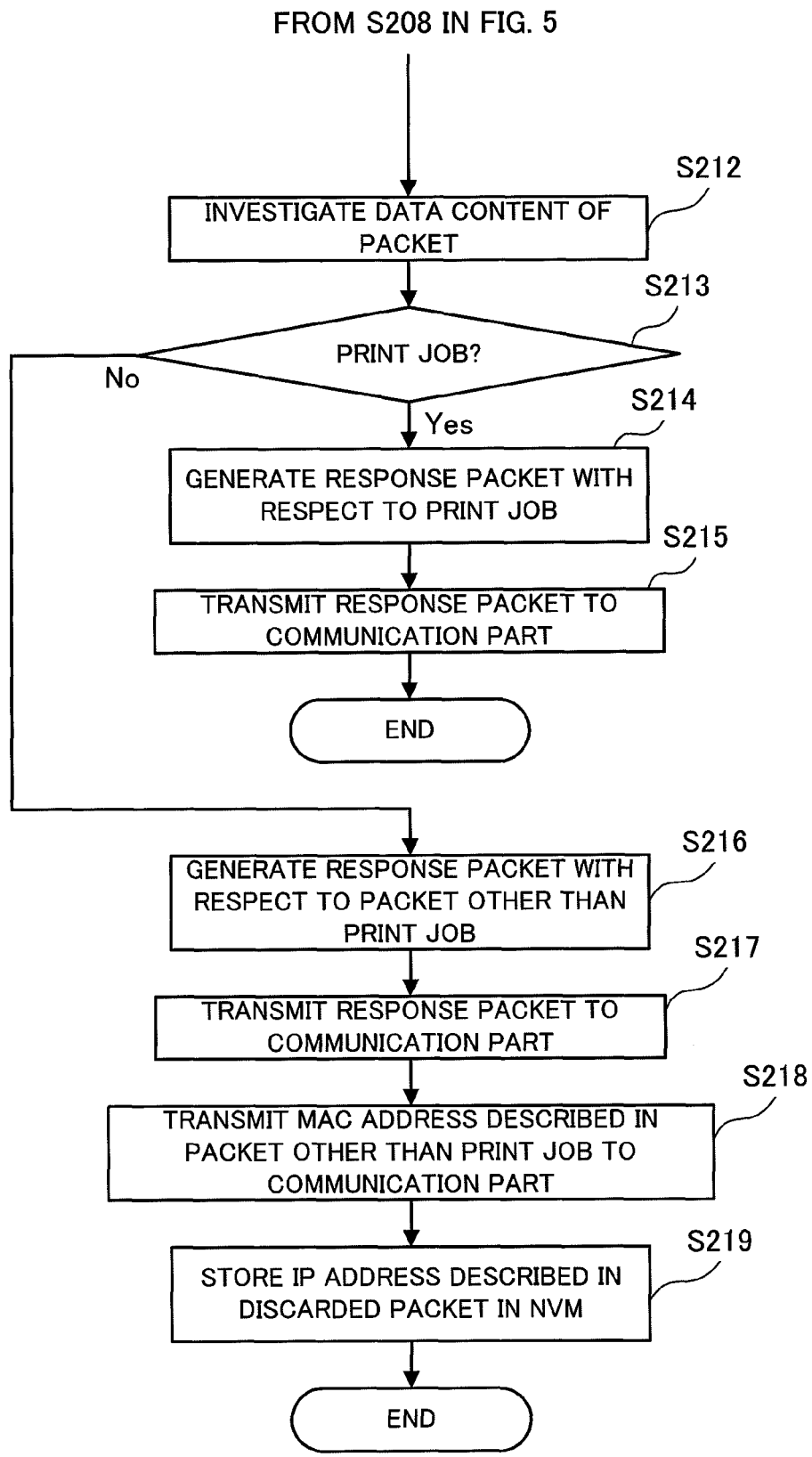

Next, FIGS. 5 and 6 are flowcharts showing an example of the operation of the controller 10 having acquired a return instruction signal from the communication part 20. The controller 10 acquires a return instruction signal from the packet determination portion 23 of the communication part 20, and then is started up while receiving electric power supply from the electric power supply part 50 (Step 201). After being started up, the controller 10 acquires a packet transmitted from the packet determination portion 23 (Step 202). The controller 10 then determines whether or not an internet protocol (IP) address described in the packet transmitted from the communication part 20 (packet determination portion 23) matches an IP address stored in the NVM 104 (Step 203). Here, the IP address is an example of identification information for identifying the client apparatus 2 that is the transmission source of the packet. Moreover, the IP address stored in the NVM 104 is an IP address of the client apparatus 2 that has transmitted a polling packet or the like, other than a print job, to the image forming apparatus 3 after the communication part 20 transmits the sleep mode transition notification packet at the time of transition to the sleep mode.

As a result of the determination in Step 203, when the IP address described in the acquired packet matches the IP address stored in the NVM 104 (Step 204), the controller 10 discards the received packet (Step 205). This processing is the same as that in Step 104 of FIG. 4. Specifically, when the client apparatus 2 is not judged, from the MAC address, to be incapable of interpreting that the sleep mode is set in the image forming apparatus 3, the controller 10 makes the judgment on the basis of the IP address, and then discards a polling packet or the like from the client apparatus 2.

When discarding the received packet, the controller 10 transmits the MAC address described in the discarded packet to the packet determination portion 23 of the communication part 20 (Step 206). The packet determination portion 23 thus acquires the MAC address described in the discarded packet, and then stores the acquired MAC address in the address memory 24. Thus, when a packet is transmitted from the same transmission source as that of the discarded packet for the next time, the transmitted packet is discarded by the communication part 20 (refer to Step 104 shown in FIG. 4). Accordingly, the controller 10 (CPU 101) is not started up from the next time, so that a low electric power consumption state in the sleep mode is maintained.

Next, as a result of the determination in Step 203, when the IP address described in the acquired packet does not match the IP address stored in the NVM 104 (Step 204), the controller 10 determines whether or not a port number described in the packet matches a port number stored in the NVM 104 (Step 207). As a result of the determination in Step 207, when the port number described in the acquired packet matches the port number stored in the NVM 104 (Step 208), the controller 10 discards the received packet (Step 209). Since the port number is designed for identification of a program to be used for communications with the destination (image forming apparatus 3) identified by the IP address, the content of the packet may be determined from the port number. Thus, a port number for identifying a polling access or the like using, for example, SNMP is stored in the NVM 104. In this manner, when the client apparatus 2 incapable of interpreting that the sleep mode is set in the image forming apparatus 3 is not judgeable, from the MAC address and the IP address both being the identification information of the client apparatus 2, the controller 10 judges a packet other than a print job from the content of the packet determined by use of the port number described in the packet, and then discards the packet.

When discarding the received packet in Step 209, the controller 10 transmits the MAC address described in the discarded packet to the packet determination portion 23 of the communication part 20 (Step 210). The packet determination portion 23 thus acquires the MAC address described in the discarded packet, and then stores the acquired MAC address in the address memory 24. Thus, when a packet is transmitted from the same transmission source as that of the discarded packet for the next time, the transmitted packet is discarded by the communication part 20 (refer to Step 104 shown in FIG. 4). Accordingly, the controller 10 (CPU 101) is not started up from the next time, so that a low electric power consumption state in the sleep mode is maintained.

In addition, the controller 10 stores, in the NVM 104 of the controller 10, the IP address described in the discarded packet (Step 211). Accordingly, even when a received packet passes through the communication part 20, the received packet is judged to be unnecessary to be processed, promptly in Step 204 in which the client apparatus 2 is determined, from the matching of the IP addresses, to be incapable of interpreting that the sleep mode is set.

On the other hand, as a result of the determination in Step 207, when the port number described in the packet does not match the port number stored in the NVM 104 (Step 208), the controller 10 investigates the data content of the packet (Step 212). Then, on the basis of the investigated data content of the packet, the controller 10 determines whether the received packet is a print job or a packet, such as a polling packet, other than a print job (Step 213).

As a result of the determination in Step 213, when the packet is a print job, the controller 10 generates a response packet with respect to the print job, for the client apparatus 2 as the transmission source of the packet (Step 214). Then, the controller 10 transmits the generated response packet to the communication part 20 (Step 215).

In this way, the transmitting portion 25 of the communication part 20 acquires the response packet from the controller 10, and then transmits the acquired response packet via the network 1 to the client apparatus 2 as the transmission source.

On the other hand, as a result of the determination in Step 213, the packet is, for example, a polling packet or the like other than a print job, the controller 10 generates a response packet with respect to the client apparatus 2 as the transmission source (a response packet with respect to a polling packet or the like other than a print job) (Step 216). The polling packet or the like here is that received from a specific client apparatus 2 as the transmission source for the first time after the transmission of the sleep mode transition notification packet. For this reason, the response packet with respect to this polling packet or the like is the sleep mode transition notification packet. Then, the controller 10 transmits the generated response packet (sleep mode transition notification packet) to the transmitting portion 25 of the communication part 20 (Step 217).

Moreover, in this case, the controller 10 transmits the MAC address described in the packet other than a print job to the packet determination portion 23 of the communication part 20 (Step 218). The packet determination portion 23 thus acquires the MAC address described in the packet other than a print job, and the acquired MAC address is stored in the address memory 24. Accordingly, when a packet is transmitted from the same transmission source as that of the packet other than a print job for the next time, the transmitted packet is discarded by the communication part 20 (refer to Step 104 shown in FIG. 4). Accordingly, the controller 10 (CPU 101) is not started up from the next time, so that a low electric power consumption state in the sleep mode is maintained.

In addition, the controller 10 stores the IP address described in the packet other than a print job (the packet that is to be discarded), in the NVM 104 of the controller 10 (Step 219). Accordingly, even when a received packet passes through the communication part 20, the received packet is judged to be unnecessary to be processed, promptly in Step 204 for the determination on the matching of the IP addresses.

Furthermore, in this case, the transmitting portion 25 of the communication part 20 acquires the response packet (sleep mode transition notification packet) from the controller 10. Then, the transmitting portion 25 transmits the acquired response packet via the network 1 to the client apparatus 2 as the transmission source.

As described above, in the image forming apparatus 3 of the present exemplary embodiment, it is determined whether or not the transmission source of a packet is the client apparatus 2 to which the sleep mode transition notification packet has been already transmitted twice, on the basis of the MAC address stored in the address memory 24 of the communication part 20 or the IP address stored in the NVM 104 of the controller 10, in the processings of Step 103 or Step 202. Thereby, the transmission source (client apparatus 2) that is incapable of interpreting that the sleep mode has been set in the image forming apparatus 3 is identified. Then, in the controller 10, a packet from such a transmission source is judged to be a polling packet or the like that is not necessary to be processed. The polling packet or the like is discarded by the communication part 20 or the controller 10. Thereby, when a packet is discarded by the communication part 20, the CPU 101 is not started up, so that a low electric power consumption state in the sleep mode is maintained. Meanwhile, when a packet is discarded by the controller 10, electric power consumption in the low electric power consumption mode is reduced because electric power is not consumed for the generation of a response packet to the transmission source of the packet.

The MAC address stored in the address memory 24 and the IP address stored in the NVM 104 are those for the client apparatus 2 to which the sleep mode transition notification packet has been transmitted again for the second time after the communication part 20 transmitted the sleep mode transition notification packet for the first time to the client apparatuses 2 connected to the network 1. In other words, the client apparatus 2 transmitting a packet again even after the transmission of the sleep mode transition notification packet for the second time is judged to be incapable of interpreting that the sleep mode has been set in the image forming apparatus 3. Then, the MAC address and the IP address of the client apparatus 2 thus determined are stored in the address memory 24 and the NVM 104, respectively.

In the above description, the number of times of transmission of the sleep mode transition notification packet used for the judgment on the client apparatus 2 as such a transmission source is set at 2 times as described above. Alternatively, the number of times of transmission may be set at 3 times or more, or the setting of the number of times of transmission may be configured to be changeable as appropriate.

Furthermore, the MAC address and the IP address used for the identification of the client apparatus 2 as such a transmission source described above may be configured to be registered in advance by a user through a user interface, such as an operation panel (not shown in the figure). With this configuration, the MAC address and the IP address relating to the client apparatus 2 identified previously by the user are stored in the address memory 24 and the NVM 104, respectively.

Moreover, the following configuration may be employed. Specifically, a different memory (second identification information memory) may be additionally provided. In this configuration, when the image forming apparatus 3 transmits the sleep mode transition notification packet to the client apparatuses 2 connected to the network 1, so as to notify the client apparatuses 2 of transition to the sleep mode in the image forming apparatus 3, identification information of the client apparatuses 2 with the sleep mode transition notification packet transmitted thereto is stored in the different memory. Then, a signal from the client apparatus 2 having the same identification information as that stored in the different memory is discarded. With this configuration, electric power consumption in the low electric power consumption mode is further reduced.

On the other hand, consider that the client apparatus 2 is not judged to be incapable of interpreting that the sleep mode has been set in the image forming apparatus 3, from the MAC address and the IP address, both being identification information of the client apparatus 2. In this case, the controller 10 judges the content of the packet on the basis of the port number described in the packet and investigation of the data content of the packet, in the processings of Step 207 and Step 212. Thereby, the controller 10 identifies a packet other than a print job, for example, a polling packet using SNMP, or the like, and discards the packet thus identified. Then, the controller 10 stores, in the address memory 24 and the NVM 104, the MAC address and the IP address, both being the identification information of the client apparatus 2 transmitting such a packet, respectively, so that a polling packet or the like transmitted for the next time is judged from the MAC address, which is the identification information, to be discarded by the communication part 20, or is judged from the IP address, which is the identification information, to be discarded by the controller 10. As a result, when such a packet is discarded by the communication part 20, the CPU 101 is not started up, so that electric power consumption in the sleep mode is reduced. On the other hand, when such a packet is discarded by the controller 10, the judgment processing on the content of the packet is unnecessary, and also, electric power is not consumed for the generation of a response packet to the transmission source of the packet. Accordingly, electric power consumption in the low electric power consumption mode is reduced.

Here, the port number stored in the NVM 104 is, for example, one registered in advance by the user. Alternatively, for example, the port number may be configured to be set in advance as a default in the image forming apparatus 3, and to be changeable by the user.

It should be noted that, in the above-described configuration, for example, a computer name or a user name of the client apparatus 2 may be used as the identification information for identifying the client apparatus 2 as the transmission source that is incapable of interpreting that the sleep mode has been set in the image forming apparatus 3.

In addition, the MAC address and the IP address stored respectively in the address memory 24 and the NVM 104 may be configured to be displayed on a user interface, such as a display panel (not shown in the figure) of the image forming apparatus 3, so that the user is notified thereof.

Furthermore, the MAC address stored in the address memory 24 may be configured to be transmitted from the packet determination portion 23 via the transmitting portion 25 to one of the client apparatuses 2 that is an administration server of the network 1. With this configuration, the administration server finds the client apparatus 2 unnecessarily transmitting a polling packet or the like, and gives notification to the user of the transmission source of such a packet. Moreover, in a similar manner, the IP address stored in the NVM 104 may be configured to be transmitted to the administration server from the communication part 20 when the controller 10 is started up. Furthermore, the MAC address stored in the address memory 24 or the IP address stored in the NVM 104 may be configured to be printed out by the image output part 32 when the image forming operation mode is set in the image forming apparatus 3. With this configuration, notification is given to the user of the transmission source with a printed paper medium.

Meanwhile, the image forming apparatus 3 may be configured such that a packet transmitted from the client apparatus 2 having a specific MAC address or IP address is not discarded, and the content of the packet is always judged by the controller 10.

Next, a description will be given of the MAC address stored in the address memory 24 of the communication part 20, as well as the IP address and the port number stored in the NVM 104 of the controller 10.

Figure 7:
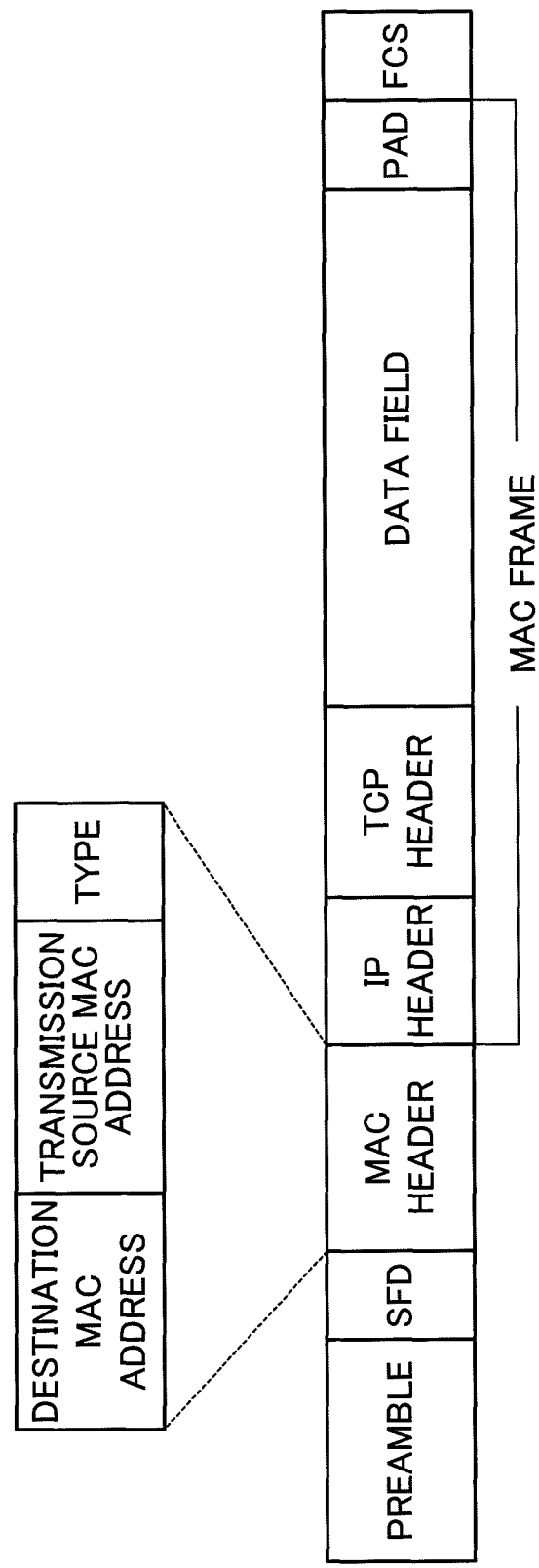
FIG. 7 shows an example of a data structure of a packet received from the network.

FIG. 7 shows an example of a data structure of a packet received from the network 1. As shown in FIG. 7, a packet (also called a "frame" in general) received from the network 1 has a structure including a preamble, a start frame delimiter (SFD), a media access control (MAC) header, an internet protocol (IP) header, a transmission control protocol (TCP) header, a data field, a PAD, and a frame check sequence (FCS), for example. It should be noted that, a region formed of the IP header, the TCP header, the data field, and the PAD is referred to as a "MAC frame."

The preamble is data for synchronization, and the SFD is data indicating that the top of the MAC frame immediately follows.

The MAC header is formed of a destination MAC address, a transmission source MAC address, and a type. The destination MAC address is an address indicating the destination to which the MAC frame is to be transmitted. The transmission source MAC address is a MAC address of the transmission source of the packet, and generally, a unique number burned in the ROM in the client apparatus 2 as the transmission source is allocated as the transmission source MAC address.

The type is identification information (protocol type) indicating an upper layer protocol stored in the data field.

The IP header is formed of a data sequence including a transmission source IP address, a destination IP address, a packet size, and the like. The TCP header is formed of a data sequence including a transmission source port number, a destination port number, a sequence number, a response confirmation number, and the like.

In the data field, data for application in a range from 46 to 1500 bites are stored. For example, print job data to be printed by the image forming apparatus 3, or the like, are stored in the data field. In addition, the PAD is a bit sequence for reducing the length of the MAC frame to the minimum, that is, 64 bites. The FCS is a bit sequence for checking whether or not the MAC frame is broken.

The MAC address stored in the address memory 24 is one of identification information for identifying the client apparatus 2 as the transmission source of a packet, and is described as the transmission source MAC address in the MAC header shown in FIG. 7. The packet determination portion 23 of the communication part 20 refers to the transmission source MAC address described in the MAC header of a packet, and then determines whether or not the transmission source MAC address matches the MAC address stored in the address memory 24 by pattern matching between the transmission source MAC address described in the MAC header and the MAC address stored in the address memory 24. Thereby, the packet determination portion 23 determines whether or not the transmission source of the packet is the client apparatus 2 to which the sleep mode transition notification packet has already been transmitted twice.

It should be noted that, the destination MAC address described in the MAC header is a MAC address of the image forming apparatus 3, and is acquired by using an address resolution protocol (ARP), which is used for acquiring a MAC address in a physical layer from an IP address, for example.

The IP address stored in the NVM 104 is one of identification information for identifying the client apparatus 2 as the transmission source of a packet, and is described as the transmission source IP address in the IP header shown in FIG. 7. The controller 10 refers to the transmission source IP address described in the IP header of a packet, and then determines whether or not the transmission source IP address described in the IP header matches any IP address stored in the NVM 104. Thereby, the controller 10 determines whether or not the transmission source of the packet is the client apparatus 2 to which the sleep mode transition notification packet has already been transmitted twice.

The port number stored in the NVM 104 is one for identifying a program used for the communications with the destination (image forming apparatus 3) identified by the IP address, and is described as the destination port number in the TCP header. For example, the port number for the hyper text transfer protocol (HTTP) is defined as 80, and the port number of the simple network management protocol (SNMP) is defined as 161. The controller 10 refers to the destination port number described in the TCP header of a packet, and then determines whether or not the destination port number described in the TCP header matches any destination port number stored in the NVM 104. Thereby, the controller 10 specifies the content of the packet transmitted from the client apparatus 2 as the transmission source so as to determine whether or not the packet is necessary to be processed by the controller 10.

Next, FIG. 8A shows an example of a management table (MAC address management table) for managing MAC addresses in the address memory 24 of the communication part 20, FIG. 8B shows an example of a management table (IP address management table) for managing IP addresses in the NVM 104 of the controller 10, and FIG. 8C shows an example of a management table (port number management table) for managing port numbers in the NVM 104 of the controller 10.

In the address memory 24, the MAC address management table shown as the example in FIG. 8A is generated, so that MAC addresses stored in the address memory 24 are managed. In the MAC address management table in the address memory 24, MAC addresses are stored while each MAC address is associated with a time of reception of the packet in which the MAC address is described, and with a status of whether or not a processing, such as a discarding processing, has been made on the packet in which the MAC address is described.

The packet determination portion 23 of the communication part 20 determines the MAC address of a received packet by use of the MAC address management table shown in FIG. 8A.

In addition, the packet determination portion 23 sets up a storage time (for example, 24 hours) for which a MAC address is stored in the address memory 24. Thus, the packet determination portion 23 refers to the time of reception of a packet in the MAC address management table, and deletes a MAC address having been stored in the address memory 24 over the predetermined storage time. By deleting MAC addresses having been stored over the predetermined storage time sequentially among those stored in the address memory 24, the storage capacity of the address memory 24 is secured, and response to a change in the network environment is achievable.

Moreover, from the status of whether or not a processing is made on the packet in the MAC address management table shown in FIG. 8A, it is judged whether or not a packet is transmitted afterward. Specifically, if the status of whether or not a processing is made is "NO," it is found that there is no transmission of a packet from the client apparatus 2 after the sleep mode transition notification packet is transmitted twice. Therefore, as for a packet with "NO" in the status of whether or not a processing is made, the packet determination portion 23 deletes the MAC address stored in the address memory 24 before the above-described predetermined storage time is elapsed.

In a similar manner, the IP address manage table shown as the example in FIG. 8B is generated in the NVM 104, so that IP addresses stored in the NVM 104 are managed. In the IP address management table in the NVM 104, IP addresses are stored while each IP address is associated with a time of reception of the packet in which the IP address is described, and with a status of whether or not a processing, such as a discarding processing, has been made on the packet in which the IP address is described.

The controller 10 determines the IP address of a received packet by use of the IP address management table shown in FIG. 8B.

In addition, the controller 10 sets up a storage time (for example, 24 hours) for which an IP address is stored in the NVM 104, similarly to the MAC address determined by the communication part 20. Thus, the controller 10 refers to the time of reception of a packet in the IP address management table, and deletes an IP address having been stored over the predetermined storage time.

Moreover, from the status of whether or not a processing is made on the packet in the IP address management table shown in FIG. 8B, it is judged whether or not a packet is transmitted afterward. Specifically, if the status of whether or not a processing is made is "NO," it is found that there is no transmission of a packet from the client apparatus 2 after the sleep mode transition notification packet is transmitted twice. Therefore, as for a packet with "NO" in the status of whether or not a processing is made, the controller 10 deletes the IP address stored in the NVM 104 before the above-described predetermined storage time is elapsed.

In addition, the port number management table shown as the example in FIG. 8C is also generated in the NVM 104, so that port numbers (destination port numbers) stored in the NVM 104 are managed. The controller 10 judges the content of a received packet by use of the port number management table shown in FIG. 8C.

Next, FIG. 9 shows an example of a time zone during which the packet processing shown in FIGS. 4 to 6 is executed in the case where the sleep mode is set in the image forming apparatus 3. As shown in FIG. 9, the time zone for the packet processing to be performed may be set up in the communication part 20 and the controller 10 of the image forming apparatus 3. In the example shown in FIG. 9, the packet processing (packet processing setting) is set to "ON" in a time zone from 21:00:00 to 7:59:59 in the next morning, so that the packet processing shown in FIGS. 4 to 6 is executed during the time zone thus set.

On the other hand, the packet processing is set to "OFF" in a time zone from 8:00:00 to 20:59:59, so that the packet processing shown in FIGS. 4 to 6 is not executed during this time zone. Specifically, during this time zone, the switching portion 22 of the communication part 20 is set so that the receiving portion 21 always forwards a packet received from the network 1 directly to the controller 10.

In this way, the above-described packet processing may be executed only in the night time when the image forming apparatus 3 is not frequently used. Thereby, reduction in electric power consumption during the time zone when the sleep mode is frequently set is achieved. On the other hand, because the sleep mode is not often set in the day time when the image forming apparatus 3 is frequently used, the image forming apparatus 3 may be set to execute normal processing in the day time.

It should be noted that, the time zone during which the packet processing shown in FIGS. 4 to 6 is executed may be changed depending on the day of the week. For example, the image forming apparatus 3 may be set to execute the packet processing shown in FIGS. 4 to 6 throughout the day, on Saturday, Sunday, and a holiday.

As described above, the image forming apparatus 3 according to the present exemplary embodiment determines the client apparatus 2 that is incapable of interpreting that the sleep mode has been set in the image forming apparatus 3, from the identification information of the client apparatus 2, and the content of a packet. Then, a packet transmitted again from the client apparatus 2 thus determined is judged to be unnecessary to be processed in the controller 10, and is thus discarded in the communication part 20 or the controller 10. Thereby, when the packet is discarded in the communication part 20, the CPU 101 is not started up, so that the state of low electric power consumption in the sleep mode is maintained. Meanwhile, when a packet is discarded in the controller 10, electric power consumption in the low electric power consumption mode is reduced because electric power is not consumed for the generation of a response packet to the transmission source of the packet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A communication apparatus comprising:
a communication unit that communicates with external apparatuses;
a notification unit that notifies the external apparatuses, using a first signal that electric power supply has been stopped to a controller which controls operation of the communication apparatus;
an identification information storage unit that stores identification information of one of the external apparatuses if the one of the external apparatuses sends a second signal to the communication unit while ignoring the notification using the first signal from the notification unit; and
a signal processor that discards a received signal that has been received by the communication unit after the notification using the first signal from the notification unit and while electric power supply to the controller remains stopped, if a transmission source of the received signal is one of the external apparatuses that has identification information matching the identification information stored in the identification information storage unit.

2. The communication apparatus according to claim 1, wherein the signal processor discards the received signal, depending on a content of the received signal, if the transmission source of the received signal is one of the external apparatuses that has identification information not matching the identification information stored in the identification information storage unit.

3. The communication apparatus according to claim 2, wherein, if the received signal is judged to be discarded on the basis of the content of the received signal, then the signal processor stores, in the identification information storage unit, identification information of the one of the external apparatuses that transmitted the received signal.

4. The communication apparatus according to claim 1, wherein:
the identification information storage unit includes:
a first identification information storage unit in which a MAC address of the one of the external apparatuses is stored; and
a second identification information storage unit in which an IP address of the one of the external apparatuses is stored, and
the signal processor includes:
a first signal processor that discards the received signal on the basis of the MAC address stored in the first identification information storage unit; and
a second signal processor that discards the received signal on the basis of the IP address stored in the second identification information storage unit.

5. The communication apparatus according to claim 1, wherein the stored identification information of the one of the external apparatuses is deleted from the identification information storage unit if a predetermined time has elapsed.

6. The communication apparatus according to claim 1, wherein, in the signal processor, a time period during which a processing of discarding the received signal is performed is set.

7. The communication apparatus according to claim 1, further comprising a second identification information storage unit in which identification information of external apparatuses to which the notification unit makes the notification using the first signal for a first time is stored, and
wherein the signal processor discards the received signal, if the transmission source of the received signal is one of the external apparatuses that has the identification information stored in the second identification information storage unit.

8. A communication method comprising:
communicating with external apparatuses;
notifying the external apparatuses, using a first signal, that electric power supply has been stopped to a controller which controls operation of a communication unit; and
storing identification information of one of the external apparatuses if the one of the external apparatuses sends a second signal to the communication unit while ignoring the notification using the first signal; and
discarding a received signal that has been received by the communication unit after the notification using the first signal and while electric power supply to the controller remains stopped, if a transmission source of the received signal is one of the external apparatuses that has identification information matching the identification information that is stored.

9. A non-transitory computer readable medium storing a program causing a computer to execute a process for reducing electric power consumption, the process comprising:
communicating with a plurality of external apparatuses by using a communication unit;
notifying, from the communication unit, the external apparatuses, using a first signal, that electric power supply has been stopped to a controller which controls operation of the communication unit; and
storing identification information of one of the external apparatuses in an identification information storage unit if the one of the external apparatuses sends a second signal to the communication unit while ignoring the notification using the first signal from the communication unit; and
discarding a received signal that has been received by the communication unit after the notification using the first signal and while electric power supply to the controller remains stopped, if a transmission source of the received signal is one of the external apparatuses that has identification information matching the identification information stored in the identification information storage unit.

10. The computer readable medium according to claim 9, wherein:
a content of the received signal is investigated if the transmission source of the received signal is one of the external apparatuses having identification information not matching the identification information stored in the identification information storage unit, to thereby obtain an investigation result, and
the received signal is discarded depending on the investigation result.

11. The computer readable medium according to claim 10, wherein, if the received signal is discarded according to the investigation result of the content of the received signal, then the identification information of the one of the external apparatuses that transmitted the received signal is stored in the identification information storage unit.

12. The computer readable medium according to claim 9, wherein the identification information stored in the identification information storage unit is deleted from the identification information storage unit if a predetermined time has elapsed.

13. The computer readable medium according to claim 9, wherein a time period during which a processing of discarding the received signal is performed is set.

14. An image forming apparatus comprising:
   a communication function unit that communicates with a plurality of external apparatuses;
   an image forming unit that forms an image on the basis of image data included in an image signal received by the communication function unit;
   a controller that controls operation of units including the communication function unit and the image forming unit; and
   an electric power supply unit that selects one or a plurality of the units on the basis of a control signal from the controller, and that supplies electric power to each of the units thus selected,
   the communication function unit comprising:
      a notification unit that notifies the plurality of external apparatuses, using a first signal, that electric power supply has been stopped from the electric power supply unit to the controller;
      an identification information storage unit that stores identification information of one of the external apparatuses if the one of the external apparatuses sends a second signal to the communication function unit while ignoring the notification using the first signal from the notification unit; and
      a signal processor that discards a received signal that has been received by the communication function unit after the notification using the first signal from the notification unit and while electric power supply to the controller remains stopped, if a transmission source of the received signal is one of the external apparatuses having identification information matching the identification information stored in the identification information storage unit.

15. The image forming apparatus according to claim 14, wherein the signal processor of the communication function unit discards the received signal, depending on a content of the received signal, if the transmission source of the received signal is one of the external apparatuses that has identification information not matching the identification information stored in the identification information storage unit.

16. The image forming apparatus according to claim 15, wherein, if the received signal is judged to be discarded on the basis of the content of the received signal, then the signal processor of the communication function unit stores, in the identification information storage unit, identification information of the one of the external apparatuses that transmitted the received signal.

17. The communication apparatus according to claim 1, wherein the identification information storage unit only stores identification information of ones of the external apparatuses that have transmitted a signal that is not necessary to transmit to the controller, after the notification using the first signal from the notification unit has been made, and while electric power supply to the controller remains stopped.

18. The communication apparatus according to claim 17, wherein the signal that is not necessary to transmit to the controller is a signal other than a print job signal.

19. The communication apparatus according to claim 18, wherein the signal other than a print job signal is a polling signal.

20. The communication apparatus according to claim 1, wherein the notification unit makes another notification if the communication unit receives a signal from the one of the external apparatuses after the notification unit makes the notification.

21. The computer readable medium according to claim 9, wherein the process further comprises making another notification if the communication unit receives a signal from the one of the external apparatuses after the notifying.

22. The image forming apparatus according to claim 14, wherein the notification unit makes another notification if the communication function unit receives a signal from the one of the external apparatuses after the notification unit makes the notification.

* * * * *